(12) United States Patent
Yeung

(10) Patent No.: US 7,498,378 B2
(45) Date of Patent: Mar. 3, 2009

(54) SELF-LUBRICATING, ORGANIC-SILICONE RUBBER MATERIAL, ITS PREPARATION, PROCESS AND USE

(75) Inventor: Ricky Yeung, Causeway Bay (CN)

(73) Assignee: SAR Holding International Limited, Causeway Bay (HK)

( * ) Notice: Subject to any disclaimer, the term of this patent is extended or adjusted under 35 U.S.C. 154(b) by 288 days.

(21) Appl. No.: 11/145,774

(22) Filed: Jun. 6, 2005

(65) Prior Publication Data

US 2006/0041055 A1 Feb. 23, 2006

(51) Int. Cl.
*C08L 83/04* (2006.01)
*C08L 83/00* (2006.01)

(52) U.S. Cl. ..................................... 524/588
(58) Field of Classification Search .................. 524/588
See application file for complete search history.

(56) References Cited

U.S. PATENT DOCUMENTS

| | | | | |
|---|---|---|---|---|
| 4,427,811 A * | 1/1984 | Elias et al. | ..................... 524/96 |
| 5,283,927 A * | 2/1994 | Gibbon et al. | ........... 15/250.48 |
| 5,623,028 A * | 4/1997 | Fitzgerald et al. | ........... 525/474 |
| 5,641,831 A * | 6/1997 | Hamilton | ..................... 524/588 |
| 5,732,436 A * | 3/1998 | Feigenbaum | ............. 15/250.41 |
| 6,004,496 A * | 12/1999 | Reo | ............................ 264/130 |
| 6,038,729 A * | 3/2000 | Feigenbaum | ............. 15/250.41 |
| 6,077,592 A * | 6/2000 | Azuma et al. | ............... 428/192 |
| 6,103,005 A * | 8/2000 | Sare et al. | ................... 106/486 |
| 6,740,405 B2 * | 5/2004 | Shudo | ........................ 428/391 |
| 2003/0050419 A1 * | 3/2003 | Sanders et al. | ................. 528/10 |
| 2003/0138655 A1 * | 7/2003 | Watanabe et al. | ........... 428/523 |
| 2003/0165683 A1 * | 9/2003 | Sharabura et al. | ........... 428/405 |
| 2003/0233722 A1 * | 12/2003 | Sawamura et al. | ............ 15/245 |
| 2004/0236014 A1 * | 11/2004 | Ota et al. | .................... 524/861 |
| 2004/0249059 A1 * | 12/2004 | Akbar et al. | ................ 524/588 |

FOREIGN PATENT DOCUMENTS

TW  412487  11/2000

OTHER PUBLICATIONS http://www.rtvanderbilt.com/ClaylnRubber.pdf.*

* cited by examiner

*Primary Examiner*—Randy Gulakowski
*Assistant Examiner*—Robert Loewe

(57) ABSTRACT

The present invention provides a self-lubricating organic-silicone rubber material and its preparation process. The self-lubricating organic-silicone rubber material comprises organic-silicone rubber, self-lubricating additive, filler and vulcanizing agent, and optionally, release agent and pigment. The self-lubricating organic-silicone rubber material of the present invention can be used in various glass-cleaning appliances, especially the screen wiper of vehicles.

17 Claims, No Drawings

SELF-LUBRICATING, ORGANIC-SILICONE RUBBER MATERIAL, ITS PREPARATION, PROCESS AND USE

TECHNICAL FIELD

The present invention relates to an organic-silicone rubber material, in particular, it relates to a self-lubricating, organic-silicone rubber material containing a self-lubricating solid additive. The present invention also relates to the preparation process of the silicone rubber material and its use in, for example, the screen wiper of vehicles.

BACKGROUND

The screen wiper on the windshield of vehicles can clean the windshield and improve the sight when driving in rain and/or snow. Traditional screen wipers are made from natural rubber, which is easy to age due to its poor weather resistance, and thereby the screen wiper can not wipe rainwater and clean the windshield well. Besides, the screen wiper would jump and generate noise.

In order to solve the above problems, many attempts have been made. For example, various coatings are applied on the surface of the rubber to improve the contact surface between rubber and glass, thereby enhance the cleaning effect. Attempts also have been made to replace the traditional rubber with silicone rubber because silicone rubber itself possesses excellent weather resistance and can prevent aging, but very strong friction between silicone rubber and glass would occur, leading to difficulty in the application.

TW 412487 discloses a silicon rubber screen wiper based on silicone rubber, to which a fluorine-containing compound and micro glass spheres are added to overcome the disadvantage of the large friction between silicone rubber and glass. However, the addition of glass spheres would cause the difficulty in mixing and the difficulty of bonding glass spheres and silicone rubber. Besides, the problems whether glass spheres would crack and cause safety incipient faults of the screen wiper are to be solved.

WO 3/050191 discloses an anti-friction screen wiper, wherein the raw material used includes ethyl vinylsiloxane polymer, fillers and anti-friction additives such as PTFE (polytetrafluoroethylene), etc. Although the addition of a certain amount of PTFE can lower the friction, the plasticity of the material is enhanced at the same time, leading to the difficulty or even incapability in extruding and molding.

SUMMARY OF THE INVENTION

The inventors of the present invention have surprisingly discovered that a self-lubricating organic-silicone rubber material can be obtained by mixing organic-silicone rubber and a self-lubricating solid additive, and adding other auxiliary components at the same time. Such a silicone rubber material possesses an excellent self-lubricating property and convenience in preparation, and can overcome the above defects existing in the prior art, so it has a wide foreground of applications.

One of the objectives of the present invention is to provide an organic-silicone rubber material with the self-lubricating property.

Another objective of the present invention is to provide a process for preparing said silicone rubber material.

A further projective of the present invention is to provide a product made from the self-lubricating, organic-silicone rubber material of the present invention.

The present invention provides a self-lubricating organic-silicone rubber material, which comprises an organic-silicone rubber, a self-lubricating additive, filler and a vulcanizing agent, and optionally, a release agent and a pigment.

The present invention also provides a process for preparing the self-lubricating organic-silicone rubber material, which comprises the following steps: mixing an organic silicone rubber, a self-lubricating additive and filler, then adding a vulcanizing agent and optionally, a release agent and a pigment to the obtained mixture.

DETAILED DESCRIPTION

The present invention will be described below in detail.

Organic-Silicone Rubber:

There is no special limitation to the organic-silicone rubber suitable for the present invention and the organic-silicone rubbers conventionally used in the art. All can be used in the present invention, such as dimethicone polymer, methyl vinyl siloxane polymer, methyl styryl siloxane polymer, methyl styryl siloxane polymer, and methyl trifluoropropyl siloxane polymer, etc. The above organic-silicone rubbers can be used alone, or as a mixture of two or more of them. The preferably used organic-silicone rubbers are those whose end group is methyl, vinyl or combination thereof, such as:

$Me_3SiO(Me_2SiO)_nSiMe_3$;
$Me_3SiO(Me_2SiO)_n(MeViSiO)_mSiMe_2R$;
$RMe_2SiO(Me_2SiO)_n(MePhSiO)_l(MeViSiO)_mSiMe_3$;
$Me_3SiO[Me(CF_3CH_2CH_2)SiO]_nSiMe_3$,

Where Me represents methyl; n, m and l are integers greater than 0, which may be the same or different; R represents methyl or vinyl; Vi is vinyl.

The content of the organic-silicone rubber in the self-lubricating organic-silicone rubber material of the present invention may be 10-70% by weight, preferably 30-60% based on the total weight of the self-lubricating organic-silicone rubber material.

Self-Lubricating Additive:

Self-lubricating additives are those which impart the organic-silicone rubber with the self-lubricating property and thereby lower the friction between the silicone rubber and glass and/or those which prevent jumpiness and noise from accruing when the organic-silo cone rubber and glass are contacted and slided.

The self-lubricating additive suitable for the present invention may be selected from the group consisting of graphite, fluorine-containing compounds, boron nitride, dimethicone, methyl hydrogen-containing silicone oil, ethyl silicone oil, vinyl silicone oil, stearates, and mixtures thereof. the preferred self-lubricating additive is selected from the group consisting of fluorizated graphite, teflon powder, methyl hydrogen-containing silicone oil, vinyl silicone oil, zinc stearate, barium stearate, and mixtures thereof.

There is no special limitation to the content of the self-lubricating additive as long as the content can impart the material with the desired self-lubricating property. In general, the content of the self-lubricating additive may be 2-30% by weight, preferably 3-20% of the total weight of the self-lubricating organic-silicone rubber material.

Filler:

The well-known fillers which can improve the mechanical property of the organic silicone rubber are all suitable for the present invention, such as those well-known strengthening fillers. The preferred filler of the present invention includes synthesized silica micro powder, natural quartz powder, kieselgur, and kaolin, etc.

The content of the filler may be 20-70%, preferably 30-60% of the total weight of the self-lubricating organic-silicone rubber material.

Vulcanizing Agent:

All the well-known vulcanizing agents can be used in the present invention. The preferred vulcanizing agent includes various organic peroxides. The present invention prefers the use of benzoyl peroxide.

In general, a vulcanizing agent accounting for 1-2% of the total weight of the self-lubricating organic-silicone rubber material is needed.

Release Agent:

Release agents well-known in the art are all usable in the present invention. The content of the release agent can be determined by the skilled in the art according to their common knowledge.

Pigment:

Various pigments available in the market and suitable for the addition to organic silicone rubber can be added according to the demand for the color. The content can be determined by the skilled in the art according to their common knowledge and the demand for the color.

Preparation:

The self-lubricating organic-silicone rubber of the present invention can be prepared by the following process:

(1) adding the organic-silicone rubber, self-lubricating additive and filler to an internal mixer and mixing therein;
(2) adding the vulcanizing agent and optionally, release agent and pigment to the mixture contained in step (1);
(3) letting the mixture obtained in step (2) stand still; and
(4) optionally, making the product obtained in step (3) into the required product.

In particular, the organic-silicone rubber, self-lubricating additive and filler are added to internal mixer and mixed well, and the mixture stands still for 1-24 hours to fully disperse the self-lubricating additive into the filler. Then the thus obtained mixture is added to open mixer, and the vulcanizing agent and optionally, the release agent and pigment are added and mixed. The thus obtained mixture stands still for more than 12 hours to uniformly disperse the vulcanizing agent.

The self-lubricating organic-silicone rubber material of the present invention can be made into the required product by conventional molding and extruding methods.

The self-lubricating organic-silicone rubber material of the present invention can be used in various places where self-lubricating materials are needed such as various glass cleaning appliances and self-lubricating tubes like peristaltic pump tubes, etc.

The self-lubricating organic-silicone rubber material of the present invention is especially suited to the screen wiper of vehicles. The screen wiper of vehicles made from the self-lubricating organic-silicone rubber of the present invention possesses an excellent self-lubricating property, water-wiping performance, and abilities to clean the surface of glass well without generating water trace and prevent the screen wiper from jumping and generating noise. Besides, the thus prepared screen wiper possesses excellent resistance to heat, violet ray, and ozone, and thereby possesses an ideal stability, weather-resistance, and aging-resistance, no longer being short-term consumable products while the screen wiper possesses excellent self-lubricating and cleaning properties. The comparison between an ordinary screen wiper and the screen wiper of the present invention is listed in the following table:

|  | Ordinary screen wiper | Screen wiper of the present invention |
| --- | --- | --- |
| Weather resistance | Bad | Good |
| Water-wiping performance | Fairish | Self-lubricating water-wiping |
| Jumping property | Fairish | None |
| Color | Black | Adjustable |

General Preparation Procedure:

A certain amount of organic-silicone rubber, self-lubricating additive and filler are added to an internal mixer and uniformly mixed, and the mixture stands still for 24 hours to fully disperse the self-lubricating additive in the filler. Then the obtained mixture is added to an open mixer, and an adequate amount of vulcanizing agent, release agent, and pigment are added and fully mixed. The obtained mixture stands still for more than 24 hours.

The examples listed in the following table were operated according to the above general procedure:

|  | Example 1 | | Example 2 | | Example 3 | |
| --- | --- | --- | --- | --- | --- | --- |
| Organic-silicone rubber | QT-040U 800 g | | QT-060U 850 g | | QT-080U 850 g | |
| Self-lubricating agent | MD-188A 150 g | | MD-188A 70 g | | MD-188A 300 g | |
| Filler | PD-30 300 g | Quartz Powder 300 g | 30 μ quartz powder 585 g | 10 μ quartz powder 585 g | Kieselgur 520 g | PD-30 520 g |
| Vulcanizing agent | Benzoly peroxide 20 g | | Benzoly peroxide 36 g | | Benzoly peroxide 40 g | |
| Release agent | QA-850B 1.5 g | | QA-850B 2.1 g | | QA-850B 2.5 g | |
| Pigment | Black 1.5 g | | — | | Blue 2.5 g | |

QT-040U: commercially available from the producer: British Condor Science-Technology Co. Ltd.;

QT-060U: commercially available from the producer: British Condor Science-Technology Co. Ltd.;

QT-O80U: commercially available from the producer: British Condor Science-Technology Co. Ltd.;

MD-188A: a mixture of a fluorine-containing compound and stearate commercially available from the producer: Taiwan Xinzhong Co. Ltd.;

QT-O850B: commercially available from the producer: British Condor Science Technology Co. Ltd.;

PD-30: 30 micro calcined kaolin, commercially available from the producer: Liyang Electronic Science-Technology Co. Ltd.

Test on the Self-Lubricating Effect:

The self-lubricating organic-silicone rubber materials prepared in the above examples are made into products by molding. After standing still and insolating for 1-2 weeks, there were still wiped water and grease slightly appearing on the surface of the products with a lubricating feeling.

CONCLUSION

The above examples are only used to illustrate but not limit the present invention. One skilled in the art can make any variations and modifications as long as these variations and modifications do not deviate from the sprits of the present invention and they are still within the scope of the present invention.

The invention claimed is:

1. A self-lubricating organic-silicone rubber material comprising:
   a. organic-silicone rubber constituting an alone siloxane based polymer or mixture of two or more of the siloxane based polymers;
   b. self-lubricating additives adapted to lower the friction between the rubber and glass, self lubricating additive is selected from the group consisting graphite, fluorine-containing compounds, boron nitride, dimethicone oil, methyl hydrogen-containing silicone oil, vinyl silicone oil, stearates and their mixtures thereof;
   c. 30 micron calcined kaolin filler;
   d. vulcanizing agents accounting for 1-2% of the total weight of the self-lubricating organic-silicone rubber material; and
   e. optionally, release agents and pigments.

2. The material according to claim 1, wherein said self lubricating additive is selected from the group consisting of fluorinated graphite, teflon powder, methyl hydrogen-containing silicone oil, vinyl silicone oil, zinc stearate, barium stearate, and mixtures thereof.

3. The material according to claim 1, wherein said self-lubricating additive is a mixture of fluorine containing compound and stearate.

4. The material according to claim 1, wherein said vulcanizing agent is benzoyl peroxide accounting for 1-2% by weight of the total weight of said self-lubricating organic-silicone rubber material.

5. The material according to claim 1, wherein said organic-silicone rubber accounts for 10-70% by weight of the total weight of said self-lubricating organic-silicone rubber material.

6. The material according to claim 1, wherein said self-lubricating additive accounts 2-30% by weight of the total weight of said self-lubricating organic-silicone rubber material.

7. The material according to claim 1, wherein said self-lubricating additive accounts 3-20% by weight of the total weight of said self-lubricating organic-silicone rubber material.

8. The material according to claim 1, wherein said filler accounts for 20-70% by weight of the total weight of said self-lubricating organic-silicone rubber material.

9. A process for preparing a self-lubricating organic-silicone rubber material comprising the steps of:
   a. adding and mixing (1) an organic-silicone rubber, (2) self-lubricating additives and (3) 30 micron calcined kaolin filler to an internal mixer to form a first mixture, the first mixture is allowed to stand still for 1-24 hours;
   b. adding the first mixture to an open mixer, to which the vulcanizing agent and optionally release agents and pigments are added thereby forming a second mixture, the second mixture is allowed to stand still for 12 or more than 12 hours.

10. A screen wiper made from a self-lubricating organic-silicone rubber material comprising:
   a. organic-silicone rubber constituting an alone siloxane based polymer or mixture of two or more of the siloxane based polymers;
   b. self-lubricating additives adapted to lower the friction between the rubber and glass, self lubricating additive is selected from the group consisting graphite, fluorine-containing compounds, boron nitride, dimethicone oil, methyl hydrogen-containing silicone oil, vinyl silicone oil, stearates and their mixtures thereof;
   c. 30 micron calcined kaolin filler;
   d. vulcanizing agents accounting for 1-2% of the total weight of the self-lubricating organic-silicone rubber material; and
   e. optionally, release agents and pigments.

11. The screen wiper according to claim 10, wherein said self lubricating additive is selected from the group consisting of fluorinated graphite, teflon powder, methyl hydrogen-containing silicone oil, vinyl silicone oil, zinc stearate, barium stearate, and mixtures thereof.

12. The screen wiper according to claim 10, wherein said self lubricating additive is—a mixture of fluorine containing compound and stearate.

13. The screen wiper according to claim 10, wherein said vulcanizing agent is benzoyl peroxide accounting for 1-2% by weight of the total weight of said self-lubricating organic-silicone rubber material.

14. The screen wiper according to claim 10, wherein said organic-silicone rubber accounts for 10-70% by weight of the total weight of said self-lubricating organic-silicone rubber material.

15. The screen wiper according to claim 10, wherein said self-lubricating additive accounts 2-30% by weight of the total weight of said self-lubricating organic-silicone rubber material.

16. The screen wiper according to claim 10, wherein said self-lubricating additive accounts 3-20% by weight of the total weight of said self-lubricating organic-silicone rubber material.

17. The screen wiper according to claim 10, wherein said filler accounts for 20-70% by weight of the total weight of said self-lubricating organic-silicone rubber material.

* * * * *